United States Patent [19]

Harand et al.

[11] 4,235,672
[45] Nov. 25, 1980

[54] NUCLEAR REACTOR PLANT WITH PRESSURIZED WATER REACTOR SECURED AGAINST BURSTING OR RUPTURE

[75] Inventors: Elmar Harand, Höchstadt; Eberhard Michel, Nuremberg, both of Fed. Rep. of Germany

[73] Assignee: Kraftwerk Union Aktiengesellschaft, Mülheim, Fed. Rep. of Germany

[21] Appl. No.: 877,742

[22] Filed: Feb. 14, 1978

[30] Foreign Application Priority Data

Feb. 14, 1977 [DE] Fed. Rep. of Germany ....... 2706216

[51] Int. Cl.² .............................................. G21C 15/16
[52] U.S. Cl. ...................................... 176/65; 176/87; 165/158
[58] Field of Search .................... 176/65, 87; 165/158, 165/163

[56] References Cited

U.S. PATENT DOCUMENTS

| | | | |
|---|---|---|---|
| 3,651,866 | 3/1972 | Lileg et al. | 176/65 X |
| 3,883,392 | 5/1975 | Burylo et al. | 176/87 X |
| 3,909,351 | 9/1975 | Tilliette | 176/87 X |
| 3,950,220 | 4/1976 | Holz | 176/65 |
| 3,992,256 | 11/1976 | Heres et al. | 176/87 X |
| 4,038,134 | 7/1977 | Dorner et al. | 176/65 |
| 4,039,377 | 8/1977 | Andrieu et al. | 176/65 |
| 4,079,967 | 3/1978 | Schoessow | 176/87 X |
| 4,098,329 | 7/1978 | Culver | 176/65 X |

FOREIGN PATENT DOCUMENTS 1137279  12/1968  United Kingdom ...................... 176/87

*Primary Examiner*—Peter A. Nelson
*Attorney, Agent, or Firm*—Herbert L. Lerner

[57] ABSTRACT

In a nuclear reactor installation secured against rupture and having a pressurized water reactor, a straight-tube steam generator having a central ascending pipe, a coolant pump and lines connecting them in a primary circulatory loop, the coolant pump being installed in a primary chamber of the steam generator and forming with the latter a structural unit, the primary loop having hot and cold lines between a pressure vessel enclosing the reactor and the primary side of the steam generator, at least part of the hot and cold lines being united along the direction of their fluidic flow paths, the structural unit formed of the pump and the steam generator being upright with relatively short, straight and horizontal primary loop lines, and sheathing protective against rupture enclosing the pump, the steam generator and the lines of the primary loop, a tube bundle having a central passageway trough which the ascending pipe extends, an inlet chamber communicating with the top of the tube bundle, an outlet chamber communicating with the bottom of the tube bundle, tube support plates holding the bottom and top of the tube bundle, the ascending pipe feeding primary medium to the inlet chamber from which the primary medium is returned through the tube bundle to the outlet chamber, and a guidance elbow having a 90°-bend extending through the outlet chamber, the guidance elbow connecting the ascending pipe and the hot line, the cold line communicating with the outlet chamber.

6 Claims, 7 Drawing Figures

NUCLEAR REACTOR PLANT WITH PRESSURIZED WATER REACTOR SECURED AGAINST BURSTING OR RUPTURE

The invention relates to a nuclear reactor plant or installation having a pressurized water reactor and being secured against rupture and, more particularly, to such a nuclear reactor plant also having a steam generator, a main coolant pump and connecting lines in a primary circulatory loop, wherein the main coolant pump, due to the installation thereof into a primary chamber of the steam generator, is united therewith into a structural unit, and strings of hot and cold lines of the primary circulatory loop extending between the reactor pressure vessel and the primary side of the steam generator are structurally united into a double line.

Such a nuclear reactor plant has become known heretofore from German Patent DT-PS No. 2,244,562 and German Patent-of-Addition DT-PS No. 2,261,477 associated therewith. In this regard, a preferred embodiment is provided therein which has, in a multiple circulatory loop arrangement, several of the integrated structural units formed of steam generator and main coolant pump grouped around the reactor pressure vessel in an upright disposition while attaining primary circulatory loop lines that are as short, straight and largely horizontal as possible. This, in turn, results in the attainment of a relatively small base area for the plant and symmetrical, defined thermal expansion relationships with observable line guidance, providing an embodiment which is especially suited for being sheathed in a casing ensuring against rupture because the components are generally formed as cylindrical members. For reasons of safety, all of the hereinaforementioned components and lines of the primary circulatory loop are accordingly expediently enclosed, respectively, by jackets or shells ensuring against rupture so that any crack or break in a component or in a line, where also it should always occur, is limited in the cross section thereof from the very start. In the heretofore known nuclear reactor plants, steam generators of the U-tube type are employed for the integrated structural units. A flow-promoting construction is thus produced for the primary chamber with the main coolant pump inserted therein. It is desired, however, that also straight-tube steam generators be installed into nuclear reactor installations that are secured against rupture because such straight-tube steam generators have a smaller base area in comparison to that of U-type steam generators, and are also able to attain flow and efficiency advantages for a straight-tube steam generator with forced throughput or flow-through independently of the construction data of the nuclear reactor plant.

A straight-tube steam generator integrated with a main coolant pump of a pressurized water-nuclear reactor plant has in itself become known (U.S. Pat. No. 3,395,076). In this regard, however, the steam generator is provided with the pump in horizontal position, which increases the base area of the primary circulatory loop nuclear reactor installation, the steam generator and built-in coolant pumps are not disposed on rays extending from the central axis of the reactor pressure vessel, which requires, thermally-expansively, less observable relationships and, also, no thought is given therein to providing security against rupture for the primary circulatory loop.

It is accordingly an object of the invention to provide a nuclear reactor plant with pressurized water reactor secured against rupture into which a straight tube-steam generator is introduced in a manner that when the main coolant pump is installed in the primary chamber of the steam generator, an advantageous construction is produced with respect to the volume of the construction, base area thereof, flow relationships and accessibility to the primary chamber.

With the foregoing and other objects in view, there is provided, in accordance with the invention, in a nuclear reactor installation secured against rupture and having a pressurized water reactor, at least one steam generator, at least one main coolant pump and lines connecting them in a primary circulatory loop, the main coolant pump being installed in a primary chamber of the steam generator and forming with the latter structural unit, the primary circulatory loop having a string of hot and cold lines between a pressure vessel enclosing the reactor and the primary side of the steam generator, the hot and cold lines being structurally united into a double line, the structural unit formed of the pump and the steam generator having an upright disposition with relatively short, straight and substantially horizontal primary circulatory-loop lines, and sheathing protective against rupture enclosing the pump and the steam generator as well as the lines of the primary circulatory loop, the steam generator being a straight-tube steam generator having a central ascending pipe, a tube bundle having a central passageway through which the ascending pipe extends, an inlet chamber communicating with the tube bundle at an upper end thereof, an outlet chamber communicating with the tube bundle at a lower end thereof, tube support plates holding the tube bundle at the upper and the lower ends thereof, the central ascending pipe communicating with the inlet chamber for feeding primary medium thereto from which the primary medium is returned through the tube bundle to the outlet chamber, and a guidance member in the form of a pipe elbow having a substantially 90°-bend extending through the outlet chamber, the guidance member connecting the ascending pipe and the hot line string of the double line, the cold line string of the double line communicating with the outlet chamber.

In accordance with another feature of the invention, the outlet chamber of the steam generator forms a pump suction chamber of the main coolant pump, the latter comprising an impeller projecting axially from below into the outlet chamber, a flow guidance device surrounding the impeller and having a guide vane ring disposed above the impeller, flow guidance walls for diverting the primary medium axially-radially, the flow guidance walls connecting the flow guidance device to the cold line string of the double line, the outlet chamber having a base spaced from the flow guidance device and defining therewith an annular intake passageway threat for the pump whereby the primary medium initially flowing downwardly in the outlet chamber is diverted, after flowing laterally toward the annular intake passageway, so as to flow axially upwardly into the pump.

In accordance with a further feature of the invention, an advance guidance vane ring is disposed in the annular intake passageway, the flow guidance device being braceable at the bottom thereof by the advance guidance vane ring.

In accordance with an added feature of the invention, the inlet chamber of the steam generator forms a pump pressure chamber of the main coolant pump, the latter comprising an impeller projecting axially from above into the inlet chamber, a flow guidance device surrounding the impeller and having flow guidance walls forming an upward elongation of the ascending pipe and having a guide vane ring disposed above the impeller, the inlet chamber having a chamber cover spaced from the flow guidance device and defining therewith an annular discharge passageway thereat for the pump whereby the primary medium initially flowing upwardly in the inlet chamber is diverted after flowing laterally toward the annular discharge passageway, so as to flow axially downwardly toward the tube support plate at the upper end of the tube bundle.

In accordance with an additional feature of the invention, the double line is a two-chamber pipe divided by a substantially horizontal partition into two chamber halves, the upper of the two chamber halves forming the hot primary line string.

In accordance with yet another feature of the invention, the double line is a coaxial two-chamber pipe, the inner pipe of which forms the hot primary line string.

In accordance with yet a further feature of the invention, the nuclear reactor installation includes a partition with a flow guidance device secured thereto and an impeller revolvable within the flow guidance device, the partition subdividing the outlet chamber into a pump suction chamber located above the pump and into a pump pressure chamber located below the pump, the pump pressure chamber communicating with the hot line string of the double line, the flow guidance device having a suction side directed upwardly toward the tube support plate at the lower end of the tube bundle.

In accordance with yet an added feature of the invention, the partition forms an inlet funnel tapering toward the suction side of the guidance device and tightly secured, at the inlet side thereof, to the inner periphery of the outlet chamber and to a line section forming part of the hot line string and, at the outlet side of the inlet funnel, to the guidance device at the inlet region thereof.

In accordance with yet an additional feature of the invention, the ascending pipe has a conically tapering axial elongation projecting into the inlet funnel and defining therewith an inlet funnel-annular channel, the inlet funnel-annular channel merging with an annular chamber defined by the flow guidance device and the impeller revolvable therein.

In accordance with another feature of the invention, the coolant pump is an axial pump.

In accordance with an alternate feature of the invention, the coolant pump is a half-axial pump.

In accordance with a concomitant feature of the invention, the nuclear reactor installation has a multiple primary circulatory loop arrangement with a plurality of the structural units, each formed of a respective pump and a respective steam generator, grouped around the reactor pressure vessel.

The advantages derivable from the invention are primarily that the advantageous double line, preferably constructed as a two-chamber pipe, can be retained for connecting the steam generator-pump structural unit and provides a simple connection of the central ascending pipe of the steam generator to the hot line string of the double line. Furthermore, the basic construction of nuclear reactor plants or installations that are secured against bursting or rupture, which employ a steam generator of the U-tube type, can be retained, which is advantageous with regard to standardization of nuclear power plants that are secured from or protected against rupture.

Other features which are considered as characteristic for the invention are set forth in the appended claims.

Although the invention is illustrated and described herein as embodied in a nuclear reactor plant with pressurized water reactor secured against bursting or rupture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
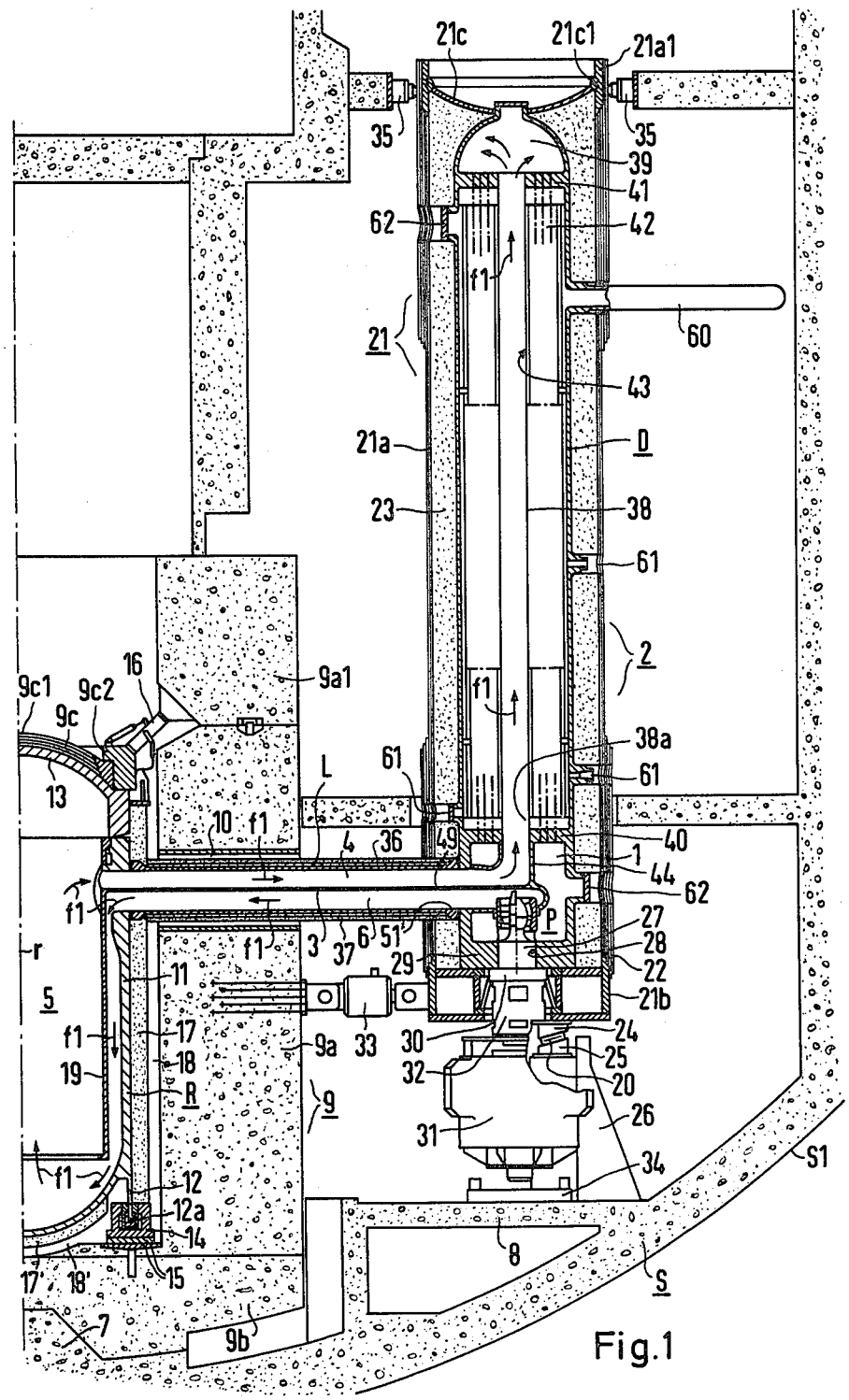
FIG. 1 is a fragmentary vertical sectional view of a nuclear reactor plant secured against rupture in accordance with the invention and showing the lower right-hand half of the plant wherein a main coolant pump is built into the lower primary chamber of a steam generator and a two-chamber pipe with a substantially horizontal partition is employed as a double line (first embodiment)
Figure 5:
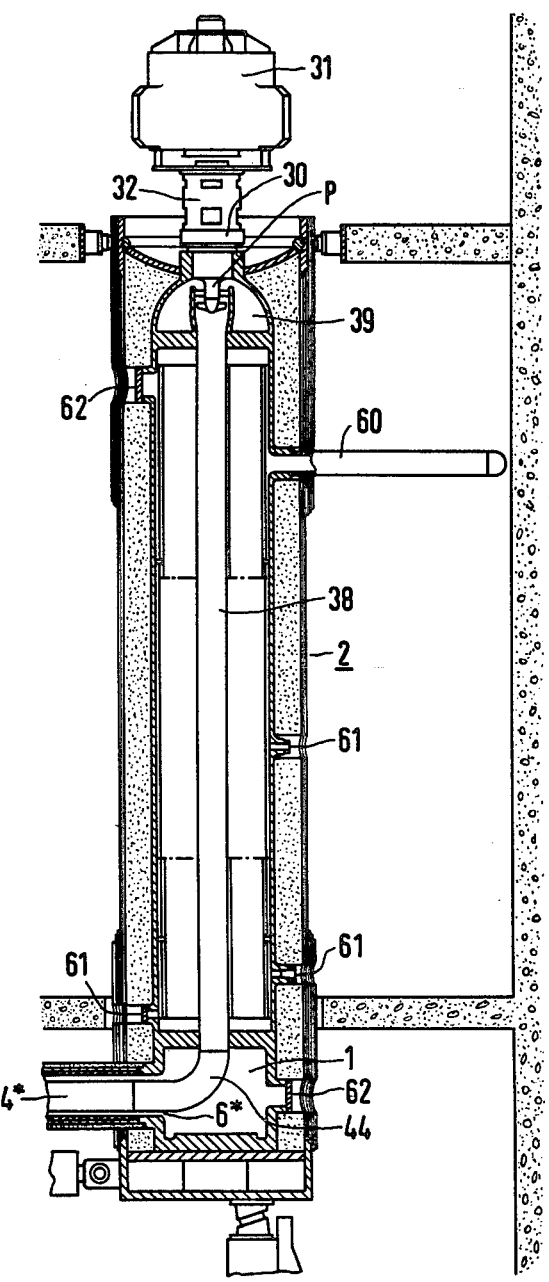
Figure 5A:
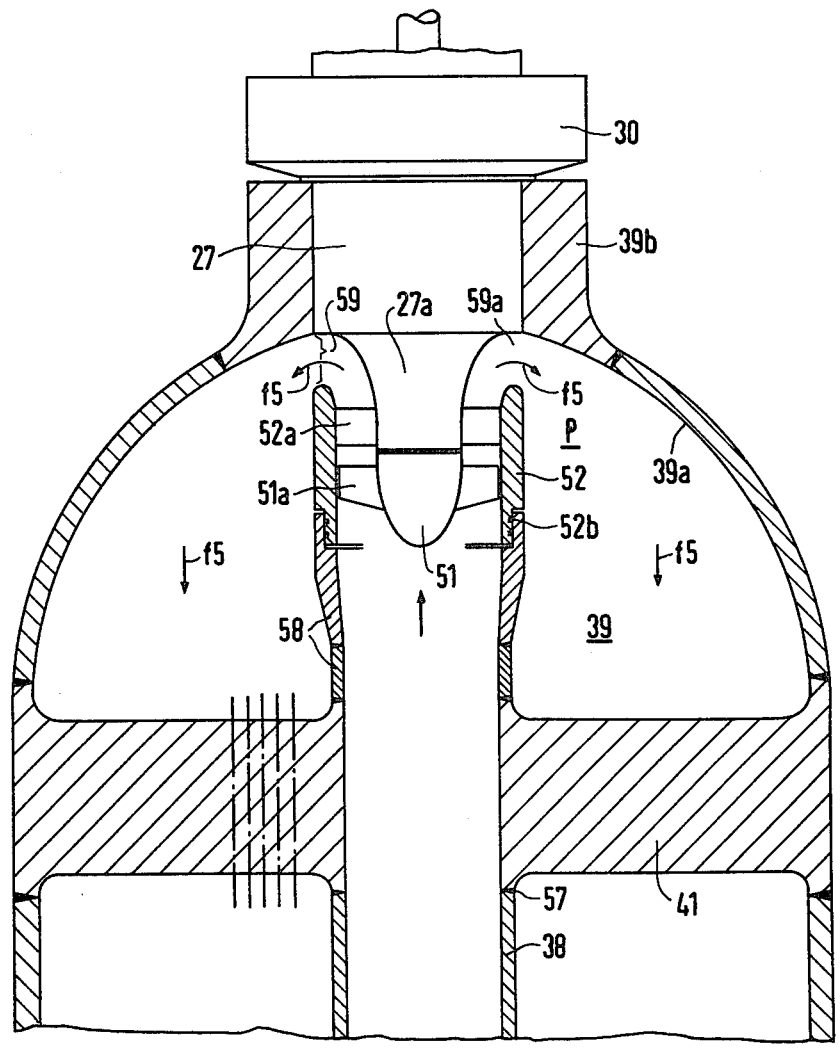

FIG. 5 is a fragmentary view of FIG. 1 showing a fifth embodiment of the invention wherein the main coolant pump is built into the upper primary chamber of the steam generator, and the guiding or diffuser device is formed by a riser pipe extension, and wherein a coaxial two-chamber pipe is employed as a double line; and FIG. 5a is an enlarged fragmentary view of FIG. 5 showing the primary chamber of the steam generator.

Referring now to the drawing and first, particularly, to FIG. 1 thereof, there is shown a nuclear reactor plant secured against rupture which includes a pressurized water reactor R, a steam generator D, a main coolant pump P and a double line or pipe L connecting the pressurized water reactor R to the pump P and the steam generator D flow-wise into a circulatory loop. The main coolant pump P, by being built into the lower primary chamber 1 of the steam generator P is united with the latter into a structural unit. The double line L is constructed as a two-chamber pipe with a substantially horizontally extending partition 3, by means of which a string or length of hot line 4, which conducts the coolant out of the core 5 of the reactor R, is pressure-tightly separated from a thereunderlying string or length of cold line 6, which conducts cooled coolant blowing out of the steam generator D to the reactor R (note the flow-representing arrows f1). In the interest of simplification, only one circulatory loop is shown in FIG. 1, since it is adequate for understanding the invention. In actuality, a multiplicity of the structural units 2 are distributed around the periphery of the reactor R and disposed in a multiple circulatory loop arrangement or circuit connection. A preferred embodiment is a four-loop circulatory arrangement for about 1300 MWe power plant output or capacity. As is apparent, the structural unit 2 is erect or upright and is disposed at such a level with respect to the reactor R that a short, straight and largely horizontal double line L is employable for connecting them to one another. The line L with the structural unit 2 thus lies virtually on a radius extending outwardly from the central axis r of the reactor R, which produces salutary bearing or supporting and thermal expansion relationships.

In particular, the containment shell S which surrounds the nuclear reactor plant, is of prestressed concrete construction with a tight steel jacket S1 and is provided with prestressed concrete foundations 7 and 8, respectively, for the reactor R and for the structural unit 2. A shell 9 protective against rupture of the reactor 9 is formed of a casing 9a with superimposed support ring 9a1, a base 9b and a cover 9c, the members 9a, 9a1 and 9b being produced by prestressed concrete technology and axially braced one to another by non-illustrated axial tension or tie rods into an upwardly open prestressed concrete vessel. The double line L extends through a radial throughbore 10 formed in the casing 9a. The reactor R has a steel pressure vessel 11 with a supporting frame 12 and a pressure-tightly braced cover 13. The supporting frame 12 peripherally surrounds the reactor R, and the latter is suspended thereby through spring rods or pins 12a on a bearing or support member 14 which, in turn, adjustable in height by means of intermediate plates 15, rests upon the base 9b of the prestressed concrete vessel 9a, 9b which, in turn, is supported upon the foundation 7. The prestressed concrete vessel 9a, 9b serves simultaneously as a biological shield. The cover 9c for protecting against rupture of the reactor R, is formed of a multilayered intercepting or capture cover 9c1 against the calotte or dome-shaped part of the pressure-vessel cover 13. In the installed operationally warm condition, the axial bracing force of the shell 9 which protects against reactor rupture is transmitted through suspension supports 16 to the reactor R (a multiplicity of suspension supports 16 being uniformly distributed over the periphery of the reactor R. The suspension supports 16 engage, on the one hand, an inwardly sloping inclined surface formed on the support ring 9a1 and, on the other hand, the capture ring 9c2, and are pivotable by non-illustrated pivot bearings and hydraulic power pistons into and out of the bracing position shown in FIG. 1. In radial direction, the force lock from the reactor R to the casing 9a protective against reactor rupture is produced by a pressure-tight insulating layer 17 and a likewise pressure-tight cooling layer 18 and, at the base of the reactor R, the force lock is effected therefrom to the base 9b of the prestressed concrete vessel 9a, 9b correspondingly through and insulating layer 17' and a cooling layer 18'. The non-illustrated nuclear core is received in a core container 19, and the flowpath of the coolant in the reactor R is also represented by arrows f1. The sheathing generally identified as 21 for protecting against rupture of the structural unit 2 is formed of a protective casing 21a, a protective base 21b and a protective cover 21c. The casing 21a is constructed as a multilayer cylinder and welded at 22 to the base 21b. The cover 21c is inwardly curved i.e. concave, is bipartite and is supported through a support ring 21c1 at an opposing ring 21a1 of the casing 21a. An annular space formed between the structural unit 2 and the casing 21a and at the bottom and the top thereof, respectively, by the base 21b and the cover 21c is filled with a pressure-tight insulating layer 23 which, just like the insulating layer 17, is advantageously formed of pressure-tight insulating concrete blocks which are removable from the annular space from the outside for the purpose of inspecting the structural unit 2 or the reactor R. The structural unit 2 is thermally displaceably mounted, by the base 21b thereof and through a bearing member 24 applied to the underside of the base 21b and formed with an inclined bearing surface, on a support member 25 having a correspondingly inclined opposing surface, the support member 25 being secured to a support bracket 26 resting on the foundation 8. A bearing 20 formed of elastomeric material is inserted between the bearing members 24 and 25 and permits radial and axial thermal displacement of the structural unit and the supports 25 and 26 therefor relative to one another in direction of inclination of the corresponding inclined surfaces. The main coolant pump P is inserted with a tight fit by a housing shaft or shank 27 thereof into a through-insertion bore 28 formed in the chamber base 29 and is tightly braced, with a housing flange 30 thereof, against the chamber base 29. The connection of the pump housing shaft 27 to the pump motor 31 is effected through a spacer member or cage 32. The pump P and the motor 31 are thus fastened in suspended disposition at the chamber base 29. A shock absorber 33 is introduced between the casing 9a surrounding the reactor R and the base 21b of the sheathing for the structural unit 2. Also provided are an assembly carriage 34 and damping elements 35 engaging at opposite sides of the upper end of the structural unit 2, as viewed in FIG. 1, as a support or bracing protective against earthquakes.

The double line L is also provided with a casing 36 for protecting against rupture thereof, the casing 36 being formed of axially strung-together steel rings, and provided as well with an insulating casing 37.

In accordance with the invention, a conventional straight-pipe steam generator with a central riser or ascending pipe 38 is employed as the steam generator D, the ascending pipe 38 passing through a bundle 42 of the straight pipes in a central pipe passageway or alley 43, the ends of the tube bundle 42 being held, respectively, in tube support plates 40 and 41, and the tube bundle 42 extending between an upper primary-side inlet chamber 39 and the lower, hereinaforementioned primary-side outlet chamber 1. The straight-pipe bundle 42 is indicated in FIG. 1 solely by dot-dash lines. The riser or ascending pipe 30 feeds primary medium into the inlet chamber 39 (note the flow-representing arrows f1), from where the primary medium flows back through the tube bundle 42 to the outlet chamber 1. The lower end 38a of the riser pipe 38 communicates with a line section 44 (note also the enlarged view of FIG. 1a) extending through the outlet chamber 1 and proceeding with a 90° bend in the form of an elbow or knee and connected to the hot string or length 4 of the double line L (FIG. 1). The cold string or length 6 of the double line L is connected to the outlet chamber 1. In particular, the lower end 38a of the riser or ascending pipe 38 is welded to the pipe support plate or base 40 by means of a circular welding seam 45 (the upper side of the pipe base or support plate 40), and the line section 44 is welded to the pipe base or support plate 40, at the underside thereof, by means of a circular welding seam 46. Opposite the outlet chamber 1, the line section 44 is, furthermore, tightly or sealingly installed by tightly welding it to the wall of the passageway opening 48 and, furthermore, at the bottom, to the partition 49. The partition 49 simultaneously forms the cover surface of the lower line section 50 which communicates with the cold string or length 6. The connection of the double line L to the line sections 44 and 50 occurs through a connecting pipe stub or union 51' welded into the wall of the primary chamber 1.

The lower primary chamber or outlet chamber 1 forms a pump suction chamber containing the main coolant pump P. The pump P is shown as an axial pump P1 in the left-hand part of FIG. 1 or 1a and as a semi-axial pump P2 in the right-hand part of these figures in order to make it clear that both types of pumps are successfully applicable. Hreinafter, reference will be made only to pumps P although either type of pump may be meant. The pump P is inserted with the impeller 51 thereof axially from below into the outlet chamber 1. A flow guidance device 52 surrounding the pump impeller 51 has a guide wheel 52a disposed above the impeller 51 and is connected through the primary-medium axially and radially diverting flow guidance walls 53 and through the guidance member or line section 50 to the cold string or pipe length 6. Due to a spacing gap 54 between the flow guidance device 52, which is constructed as a substantially hollow cylindrical insert member, and the base 1a of the outlet chamber 1, a supply or intake passageway 54a of annular cross section for the pump P1 is formed, through which the primary medium initially flowing downwardly in the outlet chamber 1, after a lateral in-flow, is diverted so as to flow axially upwardly into the pump P (note the flow arrow f1 in FIG. 1a). The guidance device 52, together with sealing rings 52b around the outer periphery thereof, received in the central bore 50a of the guidance member 50. Although not mandatory, to improve the flow, an advance guidance vane ring 55 is additionally disposed in the annular supply cross section 54 and serves to brace or support the guidance device 52 at the bottom thereof, as viewed in FIGS. 1 and 1a. Further provided are an upwardly directed, inwardly curved, and tapering pump-housing shaft portion 27a for limiting or defining the flow cross section 54a, a boss or hub 52c of the guidance device 52 and a curved flow guidance wall 44a in the guidance member 44, as well as a blade ring 51a of the impeller 51.

In the embodiment according to FIGS. 1 and 1a, the pump P, as is readily apparent, is disposed in the cold string or pipe length 6 and receives a flow from below within the outlet chamber 1. In a second embodiment of the invention according to FIG. 2, to which reference is made hereinafter, a variation is provided in contrast to this construction of the embodiment of FIGS. 1 and 1a, in that the flow to the pump P is received from above the impeller 51 and the outflow from the pump P is from below the impeller 51. Accordingly, the outlet chamber 1 is subdivided, by a partition 56 with a guidance device 52 secured thereto wherein the pump impeller 51 revolves, into a pump suction chamber 1' located above the pump P and into the pump pressure chamber 1" located below the pump P, as viewed in FIG. 2. The pressure chamber 1" communicates with the cold string or pipe length 6 of the double line L, and the suction side of the flow guidance device 56 is directed toward the pipe base or support plate 40 of the steam generator D. As is readily apparent, the flow guidance device or partition 56 forms an inlet funnel tapering toward the suction side of the guidance device 52 and being sealingly secured, on the inlet side, to the inner periphery of the outlet chamber and to the pass-through region of the line section 44, for example, by welding at 57 and, on the outlet side, in the inlet region of the guidance device 52. The flow of the primary medium is illustrated by the arrows f2.

Figure 2:
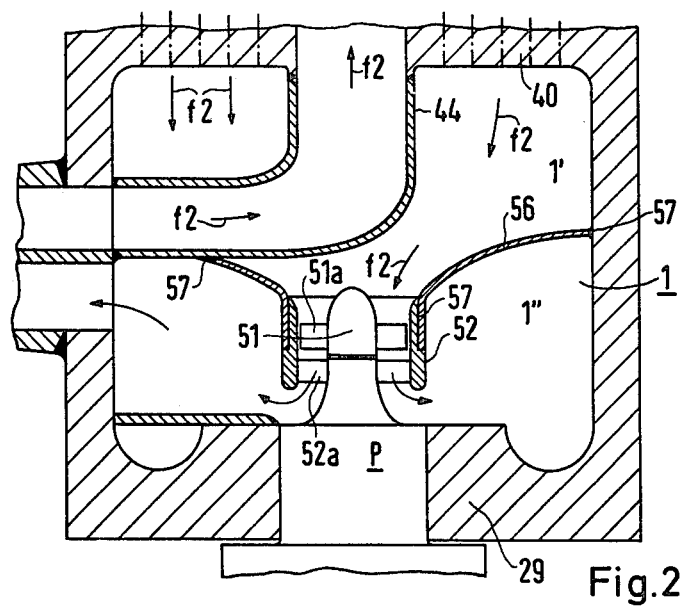
FIG. 2 is a view similar to that of FIG. 1a showing a second embodiment of the invention with a modified disposition of the lower primary chamber wherein the main direction of pumping in the pump is downwardly from above.
Figure 3:
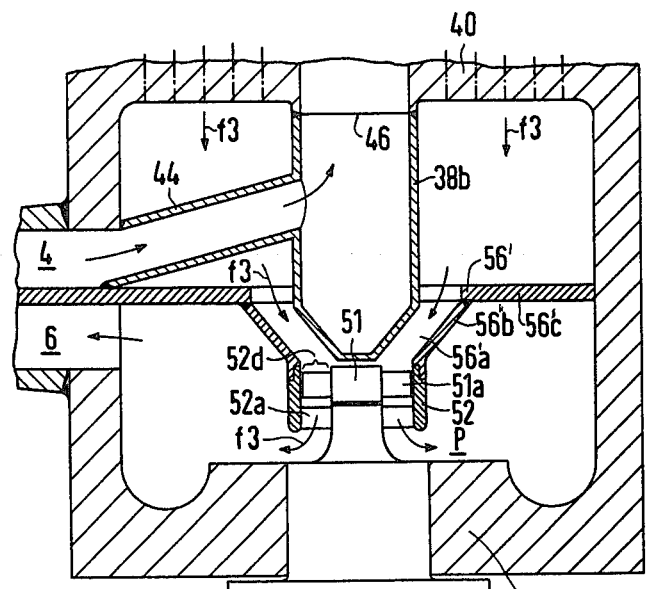
FIG. 3 is another view similar to those of FIGS. 1a and 2 of a third embodiment of the invention wherein a riser pipe-cone projects into an inlet funnel of the pump.

In a third embodiment of the invention according to FIG. 3, a variation contrasting with the embodiment of FIG. 2 is provided in that the riser or ascending pipe 38 has a conical, tapering axial elongation 38b which projects into the inlet funnel 56' and defines therewith an inlet-funnel annular channel 56'a which merges into the annular channel 52d of the guidance device 52. In addition, in this third embodiment, the partition 56' is formed of the actual funnel part 56'b and a flat annular wall 56'c. By the elongation 38b of the riser or ascending pipe 38 there is also meant a pipe section which is not directly connected to the ascending pipe 38, but rather, as shown, if firmly welded to the pipe base of support plate 40. By means of this third embodiment also, desirable flow characteristics with slight losses are able to be attained, as illustrated by the flow arrows f3. The line section 44 is not perpendicular to the riser-elongation 38b, but rather extends somewhat at an upward inclination thereto so as not to disturb the flow to the inlet-funnel annular channel 56'a.

Figure 1A:
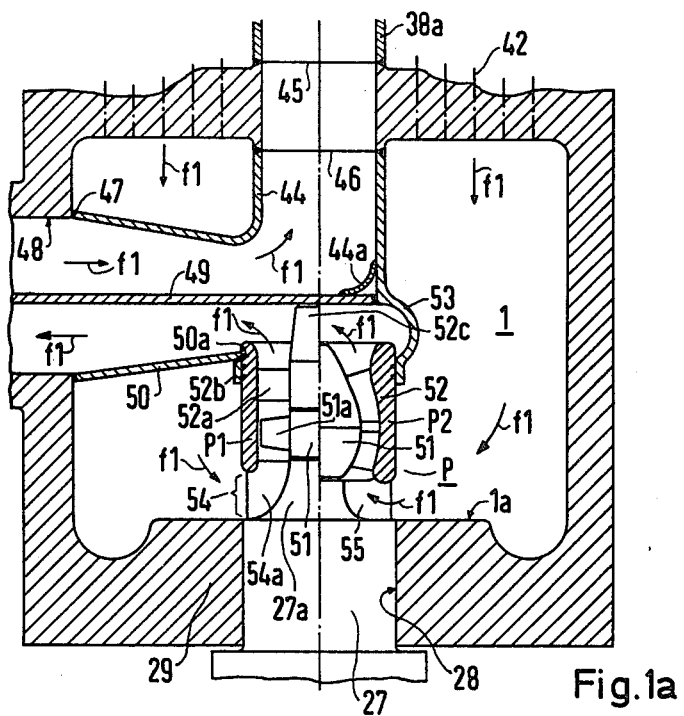
FIG. 1a is an enlarged fragmentary view of FIG. 1 showing the lower primary chamber.
Figure 4:
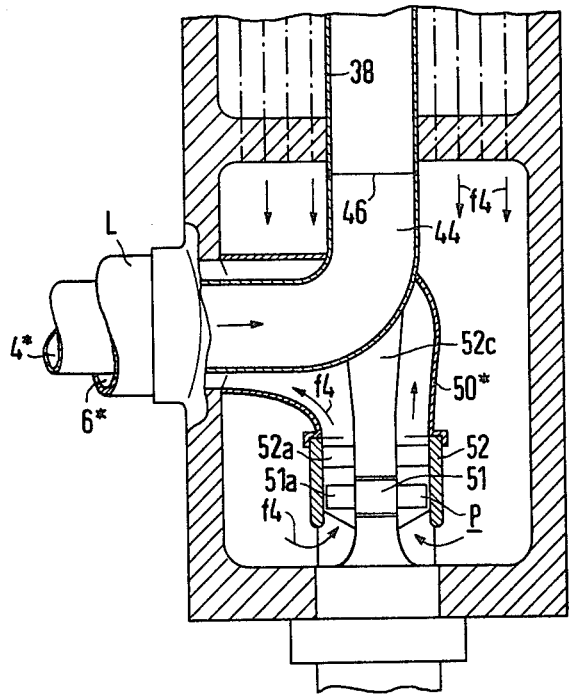
FIG. 4 is another view like that of FIG. 3 of a fourth embodiment having a modified construction of the lower primary chamber wherein the double line is a coaxial two-chamber pipe but otherwise the construction of the fourth embodiment substantially corresponds to that of the embodiment of FIG. 1.

A fourth embodiment of the invention according to FIG. 4 differs from the first embodiment according to FIG. 1a primarily in that a coaxial two-chamber pipe is employed as the double line L, the hot line string or pipe length 4* forming the inner pipe and communicating through the pipe length 44 with the riser 38, and the pipe length 44 passing through a shell-shaped flow guidance member 50* which provides the flow connection from the pressure side of the pump P to the outer pipe 6*. The boss or hub 52c projects up to a seat at the guidance member 44.

An especially simple configuration of the outlet chamber 1 with installations therein and an especially flow conducive axially symmetrical transition from suction chamber to pressure chamber of the pump is attainable with a fifth embodiment of the invention according to FIGS. 5 and 5a. With respect thereto, the inlet chamber 39 of the steam generator D or the structural unit 2 forms a pump pressure chamber containing the main coolant pump P, the impeller 51 of which is inserted axially from above into the inlet chamber 39. The flow guidance device 52 surrounding the pump impeller 51 forms, with the annular flow guidance wall thereof, an elongation or extension of the riser or ascending pipe 38 at the top thereof, as viewed in FIGS. 5 and 5a, and has a guide vane ring 52a which is disposed above the pump impeller 51, as viewed in FIG. 5a, for example. By elongation or extension of the riser or ascending pipe 38 there is meant not only a metallurgical connection but also a flow-wise continuation. The fastening or metallurgical connection of the riser 38 is effected through an annular welding seam 57 to the pipe base or support plate 4. At the upper side of the pipe base or support plate 41, as viewed in FIG. 5a, pipe lengths 58 are welded to the pipe base 41 and to one another, respectively, by annular welding seams, the upper pipe length 58, as shown, serving as a holder for the guidance device 52. By means of a clearance space 59 between the guidance device 52 and the cup-shaped or dome-like chamber cover 39a, an annular outlet or discharge passageway 59a is formed for the pump P, through which the primary medium flowing initially upwardly, as viewed in FIG. 5a, after flowing out laterally, is diverted axially downwardly to the pipe base or support plate 41 (note flow arrows f5). The flow-diverting shape of the annular outlet passageway 59a is defined or determined by a housing shaft part 27a which flares with curvature conically outwardly in direction toward a cylindrical part 27 of the housing shaft. The pump housing flange 30 is tightly braced against a beefed-up or reinforced annular flange 39b of the chamber cover 39a. FIG. 5 shows the assembly of the housing spacer member or cage 32 with the motor 31, which is not illustrated in FIG. 5a. The lower half of FIG. 5 shows that a coaxial two-chamber pipe is employed as double line in this embodiment of the invention. The central pipe 38 of the structural unit 2 is connected by means of the guidance member 44, formed as a pipe elbow, to the inner pipe 4* employed as the hot string or pipe section, whereas the outer pipe serves as the cold guidance string or pipe section and terminates in the outlet chamber or lower primary chamber 1. As is apparent, an especially simple construction of the lower primary chamber 1 is produced thereby. The riser or ascending pipe 38 serves as suction chamber for the pump P; the pump P is disposed in the hot string or pipe section, consequently deviating in construction thereby from that of the other embodiments of the invention. It has been found, however, that no thermal problems for the pump P have resulted therefrom, if the temperature drop between the primary-side inlet and outlet of the steam generator D conforms to conventional design data of such nuclear reactor plants. With the disclosed embodiments of the invention, the primary-side inlet temperature $t_{1E}$ of the steam generator D (hot string or pipe section 4 and 4*) $t_{1E} = 327°$ C., the primary-side outlet temperature $t_{1A} = 295°$ or, in degrees Kelvin: $T_{1E} = 600°$ K., $T_{1A} = 600°$ K. The primary-side operating pressure of the steam generator D was $P_1 = 158$ bar. It should also be mentioned that in FIG. 5 as well as in FIG. 1, a live steam line 60, a feedwater union 61 and manhole openings 62 for the steam generator D and the structural unit 2 also illustrated. Furthermore, it should also be noted that functionally similar members in the various embodiments shown in all of the figures are identified by the same reference characters.

There are claimed:

1. In a nuclear reactor installation secured against rupture and having a pressurized water reactor, at least one steam generator, at least one main coolant pump and lines connecting them in a primary circulatory loop, the main coolant pump being installed in a primary chamber of the steam generator and forming with the latter a structural unit, the primary circulatory loop having a string of hot and cold lines between a pressure vessel enclosing the reactor and the primary side of the steam generator, at least part of the hot and cold lines being structurally united along the direction of their fluidic flow paths, the structural unit formed of the pump and the steam generator having an upright disposition with relatively short, straight and substantially horizontal primary circulatory loop lines, and sheathing protective against rupture enclosing the pump and the steam generator as well as the lines of the primary circulatory loop, the steam generator being a straight-tube steam generator having a central ascending pipe, a tube bundle having a central passageway through which said ascending pipe extends, an inlet chamber communicating with said tube bundle at an upper end thereof, an outlet chamber communicating with said tube bundle at a lower end thereof, tube support plates holding said tube bundle at said upper and said lower ends thereof, said central ascending pipe communicating with said inlet chamber for feeding primary medium thereto from which the primary medium is returned through said tube bundle to said outlet chamber, and a guidance member in the form of a pipe elbow having a substantially 90°-bend extending through said outlet chamber, said guidance member connecting said ascending pipe and said hot line string, said cold line string communicating with said outlet chamber, said outlet chamber of the steam generator forming a pump suction chamber of the main coolant pump, the latter comprising an impeller projecting axially from below into said outlet chamber, a flow guidance device surrounding said impeller and having a guide vane ring disposed above said impeller, flow guidance walls for diverting the primary medium axially-radially, said flow guidance walls connecting said flow guidance device to said cold line string of said double line, said outlet chamber having a base spaced from said flow guidance device and defining therewith an annular intake passageway thereat for the pump whereby the primary medium initially flowing downwardly in said outlet chamber is diverted, after flowing laterally toward said annular intake passageway, so as to flow axially upwardly into the pump.

2. Nuclear reactor installation according to claim 1 wherein an advance guidance vane ring is disposed in said annular intake passageway, said flow guidance device being braceable at the bottom thereof by said advance guidance vane ring.

3. In a nuclear reactor installation secured against rupture and having a pressurized water reactor, at least one steam generator, at least one main coolant pump and lines connecting them in a primary circulatory loop, the main coolant pump being installed in a primary chamber of the steam generator and forming with the latter a structural unit, the primary circulatory loop having a string of hot and cold lines between a pressure vessel enclosing the reactor and the primary side of the steam generator, at least part of the hot and cold lines being structurally united along the direction of their fluidic flow paths, the structural unit formed of the pump and the steam generator having an upright disposition with relatively short, straight and substantially horizontal primary circulatory loop lines, and sheathing protective against rupture enclosing the pump and the steam generator as well as the lines of the primary circulatory loop, the steam generator being a straight-tube steam generator having a central ascending pipe, a tube bundle having a central passageway through which said ascending pipe extends, an inlet chamber communicating with said tube bundle at an upper end therof, an outlet chamber communicating with said tube bundle at a lower end thereof, tube support plates holding said tube bundle at said upper and said lower ends thereof, said central ascending pipe communicating with said inlet chamber for feeding primary medium thereto from which the primary medium is returned through said tube bundle to said outlet chamber, and a guidance member in the form of a pipe elbow having a substantially 90°-bend extending through said outlet chamber, said guidance member connecting said ascending pipe and said hot line string, said cold line string communicating with said outlet chamber, said inlet chamber of the steam generator forming a pump pressure chamber of the main coolant pump, the latter comprising an impeller projecting axially from above into said inlet chamber, a flow guidance device surrounding said impeller and having flow guidance walls forming an upward elongation of said ascending pipe and having a guide vane ring disposed above said impeller, said inlet chamber having a chamber cover spaced from said flow guidance device and defining therewith an annular discharge passageway thereat for the pump whereby the primary medium initially flowing upwardly in said inlet chamber is diverted, after flowing laterally toward said annular discharge passageway, so as to flow axially downwardly toward the tube support plate at said upper end of said tube bundle.

4. In a nuclear reactor installation secured against rupture and having a pressurized water reactor, at least one steam generator, at least one main coolant pump and lines connecting them in a primary circulatory loop, the main coolant pump being installed in a primary chamber of the steam generator and forming with the latter a structural unit, the primary circulatory loop having a string of hot and cold lines between a pressure vessel enclosing the reactor and the primary side of the steam generator, at least part of the hot and cold lines being structurally united along the direction of their fluidic flow paths, the structural unit formed of the pump and the steam generator having an upright disposition with relatively short, straight and substantially horizontal primary circulatory loop lines, and sheathing protective against rupture enclosing the pump and the steam generator as well as the lines of the primary circulatory loop, the steam generator being a straight-tube steam generator having a central ascending pipe, a tube bundle having a central passageway through which said ascending pipe extends, an inlet chamber communicating with said tube bundle at an upper end thereof, an outlet chamber communicating with said tube bundle at a lower end thereof, tube support plates holding said tube bundle at said upper and said lower ends thereof, said central ascending pipe communicating with said inlet chamber for feeding primary medium thereto from which the primary medium is returned through said tube bundle to said outlet chamber, and a guidance member in the form of a pipe elbow having a substantially 90°-bend extending through said outlet chamber, said guidance member connecting said ascending pipe and said hot line string, said cold line string communicating with said outlet chamber, and including a partition with a flow guidance device secured thereto and an impeller revolvable within said flow guidance device, said partition subdividing said outlet chamber into a pump suction chamber located above the pump and into a pump pressure chamber located below the pump, said pump pressure chamber communicating with said hot line string of said double line, said flow guidance device having a suction side directed upwardly toward said tube support plate at said lower end of said tube bundle.

5. Nuclear reactor installation according to claim 4, wherein said partition forms an inlet funnel tapering toward said suction side of said guidance device and tightly secured, at the inlet side thereof, to the inner periphery of said outlet chamber and to a line section forming part of said hot line string and, at the outlet side of said inlet funnel, to said guidance device at the inlet region thereof.

6. Nuclear reactor installation according to claim 5 wherein said ascending pipe has a conically tapering axial elongation projecting into said inlet funnel and defining therewith an inlet funnel-annular channel, said inlet funnel-annular channel merging with an annular channel defined by said flow guidance device and said impeller revolvable therein.

* * * * *